United States Patent
Dooner

(10) Patent No.: US 9,085,196 B2
(45) Date of Patent: Jul. 21, 2015

(54) NUT SENSING DEVICES

(71) Applicant: SafetyTrim Worldwide Holdings Limited, Middlesex (GB)

(72) Inventor: Nicholas Dooner, Surrey (GB)

(73) Assignee: Safety Trim Worldwide Holdings Ltd., Middlesex (GB)

( * ) Notice: Subject to any disclaimer, the term of this patent is extended or adjusted under 35 U.S.C. 154(b) by 177 days.

(21) Appl. No.: 13/649,921

(22) Filed: Oct. 11, 2012

(65) Prior Publication Data

US 2013/0088069 A1    Apr. 11, 2013

Related U.S. Application Data

(60) Provisional application No. 61/561,639, filed on Nov. 18, 2011.

(30) Foreign Application Priority Data

Oct. 11, 2011    (AU) ................ 2011/235942

(51) Int. Cl.
| | |
|---|---|
| B60B 3/14 | (2006.01) |
| B60B 3/16 | (2006.01) |
| F16B 1/00 | (2006.01) |
| F16B 37/14 | (2006.01) |
| B60B 7/06 | (2006.01) |
| F16B 31/02 | (2006.01) |
| F16B 39/10 | (2006.01) |

(52) U.S. Cl.
CPC ............... *B60B 3/165* (2013.01); *F16B 1/0071* (2013.01); *F16B 37/14* (2013.01); *B60B 7/068* (2013.01); *B60B 2310/316* (2013.01); *B60B 2320/52* (2013.01); *B60B 2320/524* (2013.01); *B60B 2360/32* (2013.01); *B60B 2360/368* (2013.01); *B60B 2900/211* (2013.01); *B60B 2900/3312* (2013.01); *B60B 2900/3316* (2013.01); *B60B 2900/5112* (2013.01); *B60B 2900/531* (2013.01); *B60B 2900/541* (2013.01); *B60B 2900/571* (2013.01); *B60B 2900/721* (2013.01); *F16B 31/02* (2013.01); *F16B 39/101* (2013.01)

(58) Field of Classification Search
CPC ........ F16B 37/11; F16B 1/0071; F16B 31/02; B60B 2900/3316; B60B 3/11; B60B 3/165; B60B 27/0068
USPC .................... 340/426.33, 438, 426.24, 693.5; 411/14, 8, 429, 372.5; 301/37.374
See application file for complete search history.

(56) References Cited

U.S. PATENT DOCUMENTS

| | | |
|---|---|---|
| 4,346,940 A | 8/1982 | Tatar |
| 4,569,229 A | 2/1986 | de Halleux |

(Continued)

FOREIGN PATENT DOCUMENTS

| | | |
|---|---|---|
| CA | 2206849 | 12/1998 |
| CA | 2224538 A1 | 6/1999 |

(Continued)

*Primary Examiner* — Andrew Bee
(74) *Attorney, Agent, or Firm* — Fish & Tsang, LLP

(57) ABSTRACT

A safety device configured to provide an indication of potential issues associated with a retention nut via a nut cap movably attached to a base. The nut cap(s) can have an electronic sensor configured to acquire and store digital data associated with a corresponding nut. Nut cap(s) can be coupled with a nut rotation indicator configured to provide an indication of a rotation of a corresponding nut.

22 Claims, 10 Drawing Sheets

(56) References Cited

U.S. PATENT DOCUMENTS

| | | | |
|---|---|---|---|
| 4,906,150 A | | 3/1990 | Bennett |
| 5,552,759 A | * | 9/1996 | Stoyka ................ 340/426.33 |
| 6,135,691 A | | 10/2000 | Nadarajah |
| 7,012,511 B2 | * | 3/2006 | Hayes ........................ 340/438 |
| 7,412,898 B1 | | 8/2008 | Smith |
| 7,994,901 B2 | * | 8/2011 | Malis et al. .......... 340/426.33 |
| 8,388,670 B1 | * | 3/2013 | Zou et al. .................... 607/112 |
| 2002/0089231 A1 | * | 7/2002 | Marczynski et al. .... 301/37.374 |
| 2002/0122711 A1 | | 9/2002 | Porter |
| 2005/0254920 A1 | | 11/2005 | Baughman |
| 2007/0180937 A1 | | 8/2007 | Thomson |
| 2007/0210640 A1 | | 9/2007 | Rogers |
| 2008/0253858 A1 | * | 10/2008 | Hsieh ............................ 411/14 |
| 2009/0060677 A1 | * | 3/2009 | Adams ........................ 411/431 |
| 2009/0207008 A1 | | 8/2009 | Malis |
| 2010/0054891 A1 | | 3/2010 | Nishida |
| 2011/0133542 A1 | | 6/2011 | Ratti |
| 2011/0181393 A1 | | 7/2011 | Tillotson |
| 2013/0049952 A1 | * | 2/2013 | Schnare .................... 340/539.1 |
| 2013/0209194 A1 | * | 8/2013 | Kratzer et al. ............. 411/204 |

FOREIGN PATENT DOCUMENTS

| | | |
|---|---|---|
| DE | 4002259 A1 | 8/1991 |
| DE | 19917222 A1 | 11/2000 |
| DE | 102009043267 A1 | 4/2011 |
| EP | 1312812 A2 | 5/2003 |
| EP | 1538351 A1 | 6/2005 |
| GB | 2260177 A | 4/1993 |
| GB | 2325504 | 11/1998 |
| GB | 2325504 A | 11/1998 |
| GB | 2351134 | 9/2002 |
| GB | 2409251 A | 6/2005 |
| GB | 2409888 A | 7/2005 |
| GB | 2393487 | 2/2007 |
| JP | 7280762 A | 10/1995 |
| JP | 10317306 A | 12/1998 |
| WO | 200247924 A1 | 6/2002 |
| WO | 2005021983 A1 | 3/2005 |
| WO | 2007/090986 | 8/2007 |
| WO | 2008128147 A1 | 10/2008 |

* cited by examiner

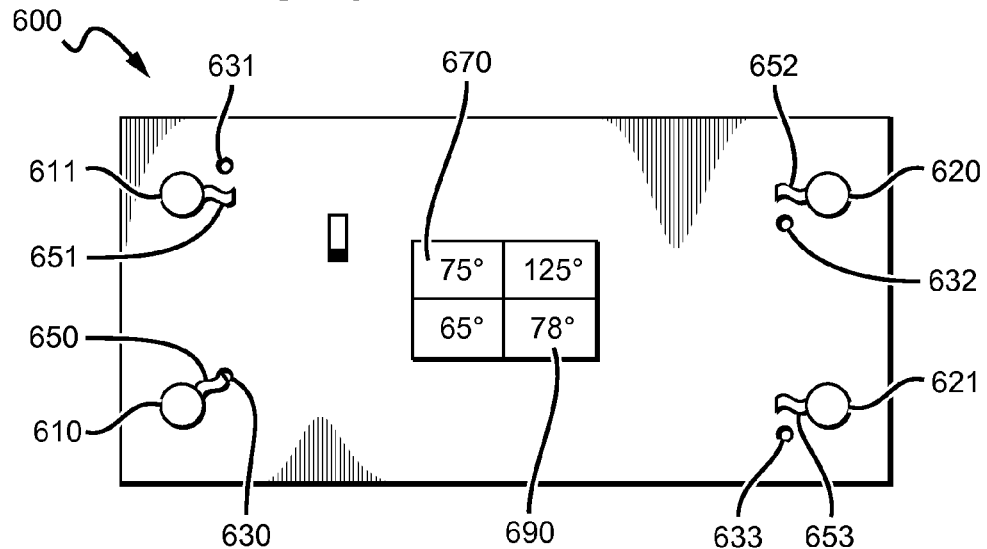

NUT SENSING DEVICES

This application claims the benefit of priority to U.S. provisional application having Ser. No. 61/561,639 filed on Nov. 18, 2011, and Australian patent application number 2011/235942, filed on Oct. 11, 2011. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is safety device technologies.

BACKGROUND

The following background discussion includes information that may be useful in understanding the present invention. It is not an admission that any of the information provided herein is prior art or relevant to the presently claimed invention, or that any publication specifically or implicitly referenced is prior art.

Wheeled vehicles (e.g., trucks, cars, etc.) secure wheels to an axel via a rim held in place by a plurality of nuts. During a normal course of traveling, the nuts can progressively loosen to the point where the wheel is no longer properly secured typically as a result of heat transfer, often through braking where expansion and contraction of the stud bolts occurs. As the stud bolts lengthen the nut torque pressure becomes reduced allowing the nut to loosen and centrifugal force to undo the nut. In some scenarios, the wheel can detach from the vehicle during travel resulting in a severe safety hazard. There exist numerous documented cases of bystanders being severely injured or dying as a result of detached wheels.

United States Patent Application Pub. No. 2002/0122711 to Porter titled "Wheel nut retainer," filed on Mar. 2, 2001 attempts to resolve these issues and describes a retainer for securing a truck wheel nut to a rim clamp of a wheel to prevent the wheel nut from turning relative to the rim clamp. Unfortunately, the device of Porter can only be secured to a truck wheel. Moreover, a separate device would need to be attached to each wheel nut and Porter does not provide an indicator to signal loosening of a wheel nut. A more desirable solution would be a device that works on more than one wheel nut and indicates that the nut is loose.

International Application WO 2007/090986 to De Lima titled "Safety device for vehicle wheel," filed on Feb. 5, 2007 and United Kingdom Patent Application GB 2325504 to Rowledge titled "Device to prevent loosening of wheel nuts," filed on Dec. 29, 1997 attempt to address these issues and describe safety devices for vehicles that include retention walls to prevent the complete loosening of wheel nuts. De Lima provides an anti-rotation means designed to co-operate with the wheel nuts. Rowledge provides a ring member with a retaining rim. Unfortunately, the devices of De Lima and Rowledge do not include nut caps to protect the wheel nuts from debris and dust, or internal ribs for structural support to reduce the flexibility of the devices. More significantly, they do not provide any easily identifiable indicators to signal the loosening of the wheel nut to the vehicle operator. A more desirable solution would include such an indicator.

Canada Patent Application CA 2206849 to Keenan titled "Truck wheel retaining device and alarm system," filed on Jun. 3, 1997 attempts to resolve such issues and discloses a system that provides an alarm to warn the vehicle operator of a loose wheel. While Keenan provides electronic signals to vehicle operator when a wheel is loose, it does not provide external validation for inspectors walking around the car. Moreover, the wiring of the system is complex and cannot be easily installed by the vehicle operator. Perhaps most significantly, Keenan fails to send electronic signals upon the loosening of individual wheel nuts.

Yet another example is United Kingdom Patent GB 2393487 to Knight titled "Wheel nut indicator and retention device", filed Aug. 29, 2002. The disclosed approach by Knight provides an exposed indicator of a loosening wheel. However, Knight's device is made of polypropylene, and also fails to send electronic signals upon the loosening of individual wheel nuts.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

What the above references fail to provide is a system that can be easily installed and understood by an average vehicle operator, include a signal upon the loosening of individual wheel nuts, and provide external validation for inspectors. Thus, there is still a need for improved nut sensing devices.

SUMMARY OF THE INVENTION

The inventive subject matter provides apparatus, systems and methods in which a safety device can provide an indication of potential issues associated with a retention nut. One aspect of the inventive subject matter includes a safety device comprising at least one nut cap rotationally attached to a base. One or more of the nut caps can have an electronic sensor configured to acquire and store digital data associated with at least one corresponding nut, preferably representing an environmental state. Additionally or alternatively, one or more of the nut caps could be coupled with a nut rotation indicator configured to provide an indication of a rotation of at least one corresponding nut.

In other aspects of the inventive subject matter, safety devices of various shapes, sizes and configurations are contemplated to fit on any object having a nut, including for example: a circular rim sized and configured to couple with a wheel of a car, truck, tractor, airplane, combine, bicycle, trailer, bus, van, motorcycle, or any other suitable land, water, or air vehicle having a nut; a base sized and configured to couple with one or more nuts or bolts on a wind turbine, helicopter, ship, boat, oil platform, pump railway track, rollercoaster, or any other suitable land, water, or air object having a nut; a stiff material configured to extend between two or more nuts coupled one or more objects; two pieces of a stiff material slideably attached to each other and configured to extend between two or more nuts separated by various distances; or even a flexible material configured to extend around various shapes to couple two or more nuts coupled to one or more objects.

It is contemplated that a safety device embodying some or all aspects of the inventive subject matter could be used in any environment where nuts or bolts are subject to vibrations or temperature changes which through expansion and contraction can allow movable nuts to de-torque.

A safety device embodying some of all aspects of the inventive subject matter could comprise any suitable number of nut caps (e.g. 8, 10, 20, or even 100). In yet another aspect of the inventive subject matter, one can provide a single stand-alone nut cap comprising an electronic sensor configured to acquire and store digital data associated with at least one corresponding nut. Additionally or alternative, the single nut cap can be coupled to a nut rotation indicator configured to provide an indication of a rotation state of the corresponding nut.

Examples of electronic sensors include, but are not limited to: (1) active sensors, for example powered, broadcasting, some RFID-based, or other types of active sensors; or (2) passive sensors such as other RFID-based, strain gauges, or other types of passive sensors. An RFID-based sensor can either be active, i.e. powered by a battery or other power source, or passive, i.e. powered by the electromagnetic fields used to read them. Contemplated sensors include for example, temperature sensors, rotation counters, balance monitors, accelerometers, vibration monitors, strain or stress gauges, compression or tension gauges, torque sensors, torsion sensors, RFID tags, video cameras, or other sensors. Further, contemplated devices can include additional elements such as electronic circuits capable of controlling electronic aspects of the device including sensor data acquisition, LED displays, speakers, or other types of devices.

It is contemplated that an electronic sensor could also serve as a nut rotation indicator. Preferably, one or more of the nut rotation indicator(s) will be distinct from the electronic sensor(s). An example of a nut rotation indicator that is distinct from an electronic sensor includes a tab coupled to a nut cap that rotates with the nut cap upon rotation of the nut.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 6 illustrates an LED screen showing real-time digital nut data.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Figure 1A:
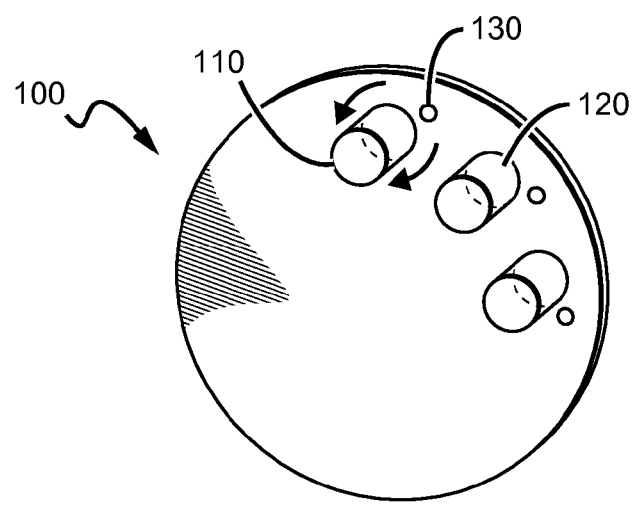
FIG. 1A is an example of a safety device.
Figure 1B:
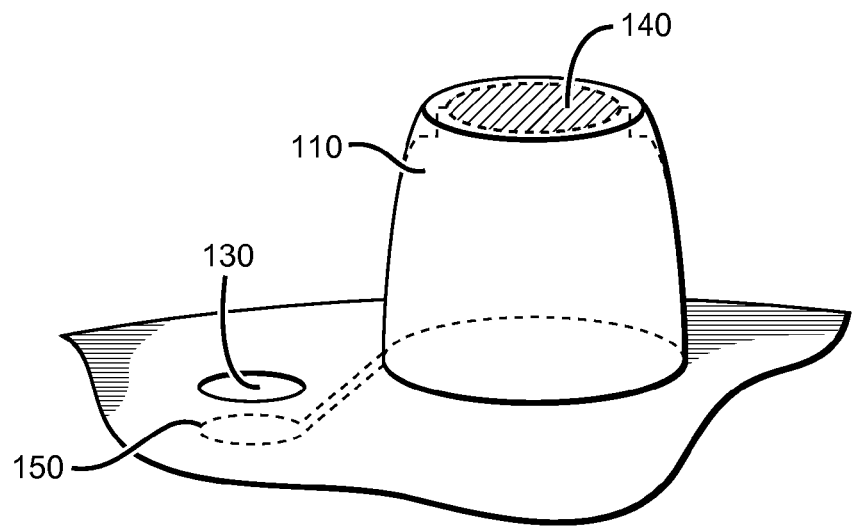
FIG. 1B is a perspective view of a single nut cap from the device of 1A.

FIGS. 1A-1B is an example of a safety device 100. Device 100 comprises a first nut cap 110 and second nut cap 120 rotationally coupled to a base. The base comprises an alert hole 130 through which a nut rotation indicator 150 can be viewed when a nut cap 110 rotates, thereby causing the corresponding nut rotation indicator 150 to rotate from a non-exposed position to an exposed position. Rotation indicator 150 can be integral with nut cap 110, and allows external observers to determine a rotational state of a corresponding nut. Although multiple nut caps are shown on device 100, one should appreciate that the device 100 could include one, two, five, ten, twenty, or more of nut caps 110 or 120. As used herein, the term "integral" means comprising the same work piece. For example, where X is integral with Y, X and Y comprise a single work piece.

It is contemplated that one or more nut caps, e.g. nut cap 110, can be coupled with an indicator, e.g., indicator 150, in a manner where rotation of the nut cap moves the indicator from a non-exposed position to an exposed position as viewed through an alert hole, e.g., alert hole 130. Indicator 150 is configured to rotate with nut cap 110 within a range (e.g., 45°, 75°, 90°, 180°, 360°, etc.) such that indicator 150 can be viewed through alert hole 130 within that range. In some preferred embodiments, a rim includes a retention wall (See FIG. 2, element 297), which prevents rotation of the nut cap 110. The wall restricts rotation of the indicator 150 and the corresponding nut (not shown) beyond the wall, thereby keeping the nut securely attached while still providing an indication that the nut has become loose via an alert hole. In some embodiments, the indicator 150 can include a non-visible indicator, for example an audible sound, tactile feedback, a wireless signal, an RFID value, or other type of non-visible indication.

Additionally or alternatively, the nut rotation indicator could comprise a sensor configured to provide digital rotation data of the nut, including for example, an angle of rotation, a torque, a torsion, a rate of rotation, a trend of rotation, historical rotation data, or other digital rotation data. Such data is considered advantageous on numerous fronts. In embodiments where a device such as device 100 is deployed on a wheel of a vehicle, the vehicle owner can obtain, or otherwise view, the data to determine rotational state or environmental state of the nuts. Further, safety professionals can obtain to the data can track historical information or trends in the nut data for analysis. Still further, nut manufactures can obtain the data to determine performance data associated with their products.

Nut cap 110 can further comprise an electronic nut sensor 140 configured to acquire and store digital nut data of a corresponding nut (not shown). It is contemplated that digital nut data could comprise rotational data as described above, or non-rotational environmental data, including for example, a force, a sheer, a stress, a strain, a tightness, a log of data, a compression, a tension, a temperature, a density, a vibration, or other environmental data. One should appreciate that the environment data can cover a broad spectrum of information about the nut. All possible data related to a nut is contemplated.

Digital nut data can be presented using any suitable modality, including for example, visual, audible, or any other suitable modality. This data can be communicated to a person of interest through a screen or speaker on the device itself, or at another location that is communicatively coupled to the device. For example, an operator or technician responsible for the nut can receive the digital nut data on a screen or speaker coupled to a dashboard or other interior portion of a vehicle, a cellular phone, a computer, a personal digital assistant, a tablet computer, a watch, or any other suitable object worn by the operator. As used herein, the term "communicatively coupled" includes both wired and wireless communication coupling. Examples of wireless coupling include coupling via near field communications, cellular networks, WiFi networks, remote controls, RFID, wireless USB, dedicated short range communications, IrDA, or any other suitable wireless communication channels. One should appreciate sensor 140 can include a passive sensor or an active sensor. A passive sensor provides sensor data in response to a query (e.g., RFID, etc.).

In some embodiments, the electronic nut sensor 140 comprises an active sensor that can be coupled to a power source or power converter, including for example, a photovoltaic cell, a battery, a thermocouple, or other power source or converter. In such embodiments, the active sensor is configured to provide nut data under its own accord. It is contemplated that the power source or power converter can be attached to any part of the device, or an object coupled to the device, including for example, a nut cap, a base, the brakes of a car to which the device is coupled, or any other part of the device or object.

It is further contemplated that the electronic nut sensor 140 can comprise a wireless interface, including for example, a Bluetooth®, Zigbee®, 802.11, WUSB, WiFi, or other wireless interface.

Figure 2:
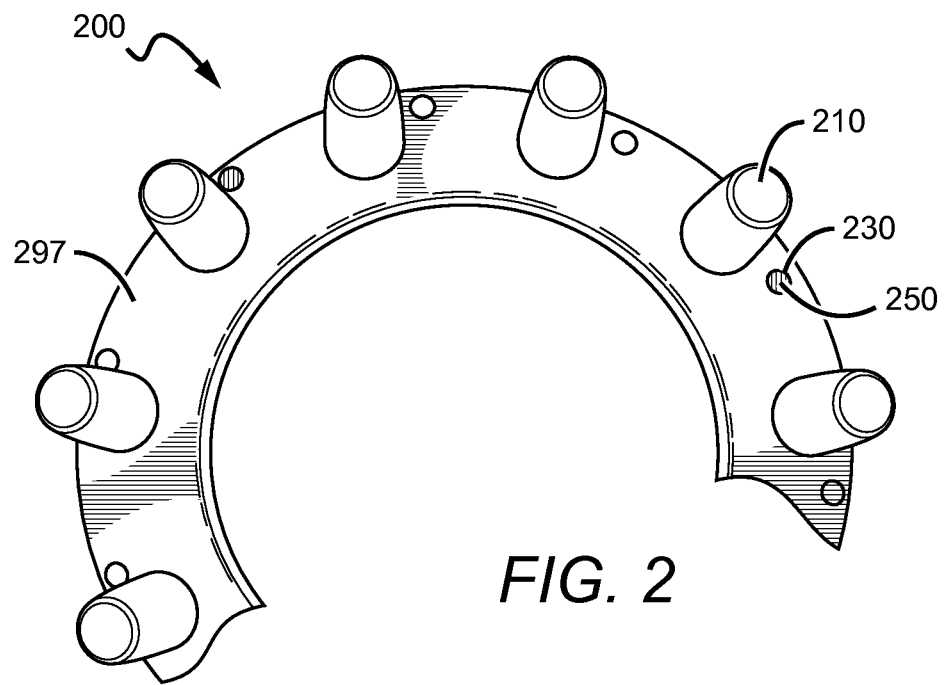
FIG. 2 is a partial view of another example of a safety device.

FIG. 2 is an embodiment of some aspects of the inventive subject matter as shown in a SafetyTrim™ device comprising 10 nut caps (7 shown). SafetyTrim is a nut management system, primarily for vehicle wheels, which both visibly indicates there is a loose nut and more importantly locks that nut in place until it can be re-torqued.

A safety device in accordance with the inventive subject matter (e.g. a SafetyTrim™ device) can be especially useful in industries where vehicles or other objects are subject to differential thermal contractions or extreme vibrations, such as the agricultural industry. For example, combines, tractors, and other farm equipment are often driven over bumpy or uneven surfaces where one tire can be driven over hard wet soil while another tire is driven over dry tilled soil. Such variations can cause farm equipment to experience large amounts of vibrations, which could contribute to the loosening of wheel nuts.

Each device can be molded from any suitable material or materials, including for example a metal, a steel, a wood, a plastic, a polypropylene, a nylon, or any other suitable material. Preferred devices comprise material(s) that are corrosion resistant. For example, the materials can be robust against saltwater, heat, dirt, and other damaging elements, making the device suitable for use on, among other things, underwater oil platforms, race cars, and tractors. Preferred devices are Nylon-based and generally comprise a synthetic fiber known as Nylon 6-6, re-enforced with Silica for superior heat and friction resistance. Example material can include Grilon TSS/4 schwarz 9832 offered by EMS-CHEMIE. The melting point is approximately 180-260 degrees Celsius, and more specifically, approximately 256 degrees Celsius. Contemplated materials can be insoluble in water, and have a density of 0.9 to 1.1. Nylon 6-6 has a chemical 'memory' which allows it to revert back to its original shape, therefore the device fits tightly and snugly once pushed over a nut, but it is straightforward to fit and remove. Its design is such that splines, some tapered and some not, allow a nut to be covered by the nut cap whilst in any position. The use of Nylon 6-6 can have various advantages over other materials such as polypropylene. For example, Nylon 6-6 is an engineering plastic, while polypropylene is a commodity thermoplastic. Nylon 6-6 has physical properties that are considered advantageous over other materials, over polypropylene for example. Example advantageous properties include for example, a higher melting point, a greater resistance to corrosion, heat and abrasion, a better texture and feel, or a longer life. Moreover, Nylon 6-6 allows for a strong interference fit with a nut or nut supporting surface, while polypropylene apparently does not because Nylon 6-6 offers a stronger shape memory. For example, a nut cap comprising Nylon 6-6 will retain its shape through highly fluctuating temperatures while a polypropylene lacks such a capability.

In some embodiments, a base material can be compatible with vacuum metallization for an enhanced appearance or corrosion resistance (e.g., a chrome finish). All known materials suitable for vacuum metallization are contemplated. For example, the material to be coated can comprise a plastic, metal, ceramic, or a Nylon, and the coating material can comprise an aluminum, copper, platinum, titanium, chromium, chromium titanium, gold, lead, nickel, silver, tin, or other materials.

Each nut cap 210 is snap fit with, and freely-rotating, inside a trim or fixing plate. If a corresponding nut (not shown) rotates, nut cap 210, snugly fitting on the nut (e.g., via an interference fit), rotates with the nut and with it rotates its own nut rotation indicator 250, such as a retention arm, which is molded as part of the nut cap. The result of this rotation can then be clearly seen through an alert hole 230 as the nut rotation indicator 250 rotates from beneath the trim or fixing plate molded into the trim/plate. At the edge of the trim/plate is a retention wall 297, part of the design of the overall trim, which prevents the nut rotation indicator 250 from rotating any further. The arm will not rotate further than the retention wall and as it is attached to the nut, further rotation or de-torqueing of the nut is consequently arrested.

As mentioned above, the nut caps (e.g. 210) preferably comprise internal tapered splines and a void, which allows for a universal fit to nuts of various shapes or lengths, and a vacuum fit. Such features are considered to increase the security of the fit while also allowing the user to remove the trim easily. Once fitted to the nut, the material composing the nut cap attempts to return to its original molded shape, thus creating a firm grip on the nut. It is also contemplated that the trim device can include an additional tool that further eases removing of the trim where the tool can be used to break a possible vacuum that might form between the nut and the nut cap.

It is contemplated that some devices can be completely protected against tampering by permanently locking onto a nut or other portion of an object. For example, a molding material such as pitch, silicon, resin, epoxy, or other molding material can be inserted into the nut cap. Such features are considered to increase the security of the fit while also allowing the user to remove the device when desired.

Preferred devices 200 having a retention wall 297 also comprise an empty center region, or hole, allowing for protruding hubs. Such configurations are considered applicable to vehicles (e.g., trucks, etc.) having protruding hubs or wind turbines having central hubs.

Other contemplated devices can lack a retention wall on its outer edge, and can optionally comprise a rotation stop configured to block movement of a retention arm beyond a specified point. As used herein, a "stop" or "rotation stop" is used broadly to include any piece of material of any suitable size and shape that is configured to block a rotation of a nut cap, either directly or indirectly.

In such devices, a rotation indicator can start in a hidden position when a corresponding nut is tight, but move to an exposed position beyond the outer edge of the device when a corresponding nut is loose. Where the device optionally has a rotation stop within the housing, such stop can act to block a rotation indicator from rotating past a specified point so that the rotation indicator does not rotate to a hidden position on an opposite side. Such embodiments could be beneficial in industries, such as the mining or agricultural industries, where darkness or dirt might obfuscate the appearance of a retention arm through an alert hole.

For example, when a device according to the inventive subject matter is incorporated onto a mining device, such as a backhoe loader or a hydraulic excavator, the device could quickly become covered in dirt during use such that a rotation indicator may not be visible through an alert hole. However, a rotation indicator that rotated beyond the edge of the device, thereby changing the overall shape of the perimeter of the device, would be readily visible to an inspector. If the device further comprises a rotation stop, a nut corresponding to the rotation indicator would be restricted from further rotation.

Alternatively, a retention wall could be slidably coupled to the device such that a nut rotation indicator would push the retention wall outwards when a corresponding nut loosens. It is contemplated that the retention wall could be configured to slide outwardly by at least 1 mm, 5 mm, 10 mm, or even 50 mm away from the edge of the device, thereby changing the overall shape of the device. It is further contemplated that there can be a distinct retention wall slideably coupled to each nut rotation indicator. In these instances, only the retention wall corresponding with the single nut rotation indicator would move outwardly, thereby changing the overall shape of the device and retention rim from a circle to a circle with a protruding wall. Such embodiments would also be beneficial for objects used in extreme conditions.

Figure 3:
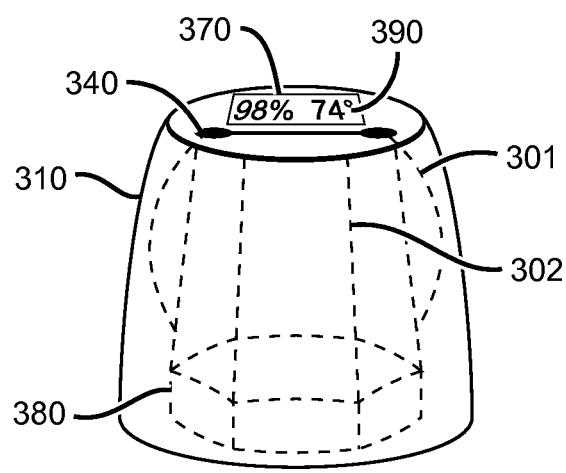
FIG. 3 is an example of a nut cap.

FIG. 3 is an example of a nut cap 310 comprising a combined electronic sensor/nut rotation indicator 340 coupled to a nut 380 through wires 301, as well as a display screen 370 and tapered splines (e.g. 302). The display screen 370 is configured to present digital nut data 390 (e.g. temperature) of the corresponding nut 380, as well as an indication of a rotation of the corresponding nut 380, for example, the percent of original tightness remaining, wherein 100% is equivalent to no rotation and 0% is equivalent to a 360 degree rotation.

It is contemplated that a nut cap 310 can be configured to only partially cover a corresponding nut 380. However, preferred embodiments include one or more nut caps 310 that are configured to completely cover a corresponding nut thereby keeping the nut 380 substantially free of dust and other unwanted debris.

Figure 4:
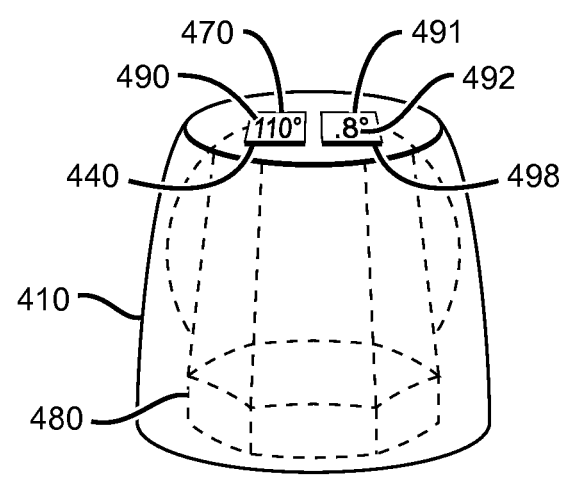
FIG. 4 is an alternative example of a nut cap.

FIG. 4 is an alternative example of a nut cap 410 comprising an electronic sensor 440 and a distinct nut rotation indicator 498, each directly coupled to a nut 480. Digital nut data 490 is displayed on screen 470, and an indication of a rotation of a nut 492 (e.g., digital rotation data), such as a degree of rotation from a starting point, is displayed on screen 491.

It is contemplated that the digital nut data 490 or indication of a rotation of a nut could comprise real-time data that is streamed to the display screen 470 or to a communicatively coupled display screen. Such communicatively coupled display screens 470 can be on a dashboard or other interior portion of a vehicle, on a cellular phone, a computer, a personal digital assistant, a tablet computer, a watch, or any other suitable display. The coupling could be wire-based or comprise a wireless channel of communication, including for example, near field communications, cellular networks, WiFi networks, remote controls, RFID, wireless USB, dedicated short range communications, or any other suitable communication channels.

Figure 5A:
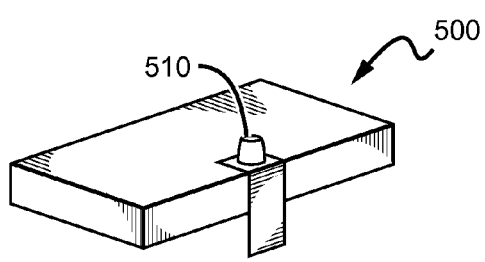
FIG. 5A is an example of a device comprising a single nut cap.
Figure 5B:
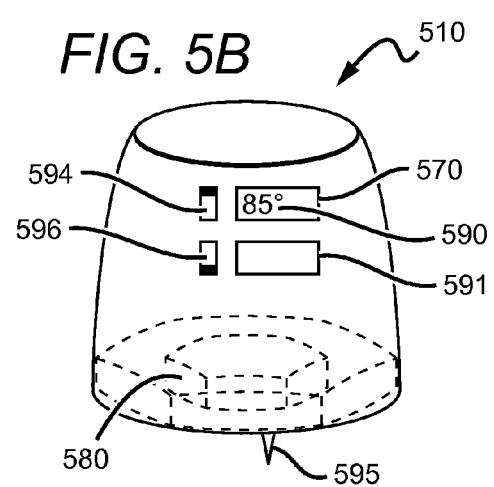
FIG. 5B is a perspective view of the nut cap of device 5A.

FIGS. 5A and 5B show a device 500 comprising a single nut cap 510. Nut cap 510 could also be viewed as a single stand-alone nut cap. The nut cap 510 comprises two separate nut rotation indicators. The first indicator is a tab 595 coupled to nut cap 510 and configured to rotate with the nut cap 510 so that a viewer could see how much a nut has rotated with respect to its starting point. The second indicator (not shown) could be the same as, or distinct from, an electronic sensor (not shown). Nut cap 510 further comprises actuators/switches 594 and 596 coupled to display screens 570 and 591 respectively. Display screen 570 displays a digital nut data 590 of a corresponding nut 580 when actuator/switch 594 is turned on.

FIG. 6 illustrates a device 600 comprising a display screen 670, such as an LED screen, showing real-time digital nut data (e.g. 690). Display screen 670 is configured to display digital nut data of corresponding nuts (not shown, covered by nut cap 610, 611, 620 and 621) in real-time. Digital nut data 690 on the lower right hand portion of the display screen 670 corresponds to the nut covered by nut cap 621 and is in the process of changing from 78 degrees to 79 degrees. Each of the nut caps 610, 611, 620 and 621 is coupled to a nut rotation indicator 650, 651, 652 and 653 respectively, which can move into an exposed position through corresponding alert holes 630, 631, 632, and 633.

Figure 7:
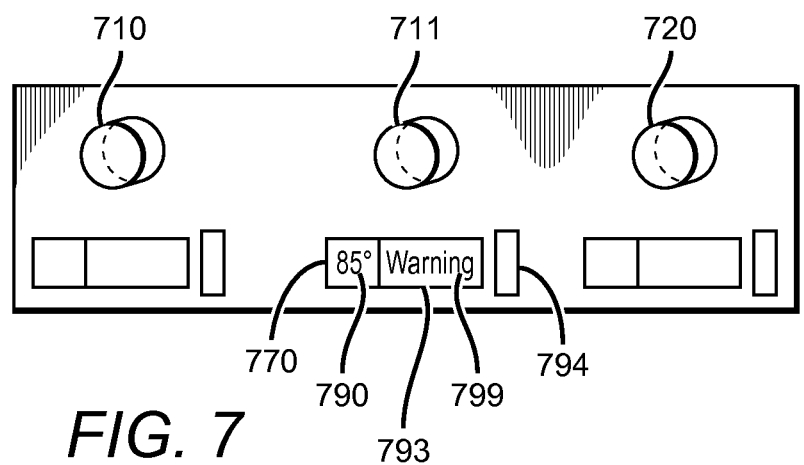
FIG. 7 illustrates an LED screen showing both individual nut data and aggregate nut data.

FIG. 7 illustrates a device comprising three nut caps 710, 711 and 720, and display screens 770 and 793, such as LED screens, showing both individual nut data 790 and aggregate nut data 799. It is contemplated that the nut data (790 or 799) could be secured through an authorization or authentication mechanism. Such mechanism could restrict the access to nut data (790 or 799), or restrict whom deletions or other modifications to the nut data could be made by. Thus, it is possible that access to the nut data could be restricted to an operator, owner, inspector and insurance adjuster, while those who can make modifications to the nut data could be limited to an inspector and insurance adjuster. Contemplated authorization methods include the requiring of a pin code, password, or any other predetermined set of numbers, letter or words. Contemplated authentication methods include the use of fingerprint detectors, iris detectors, voice recognition systems, or any other suitable authentication methods. Here, nut cap 711 is coupled to a corresponding biometric sensor 794 (e.g. a fingerprint detector) and display screens 770 and 793. Display screen 770 shows a digital nut data 790 of corresponding nut (not shown), while a second display screen 793 shows an aggregate data 799 of two or more nuts (e.g. under nut caps 710 and 711) coupled to the device (e.g. a warning sign when at least one of the nuts are within 5 degrees of a predetermined maximum allowable temperature).

Figure 8:
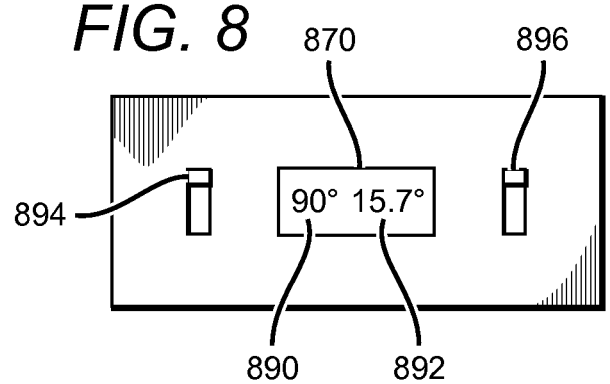
FIG. 8 is an example of an LED screen showing both digital nut data and an indiciation of a rotation of a nut.

FIG. 8 is an example of a device comprising a single display screen 870, wherein the digital nut data 890 is configured to appear upon actuation of switch 894, and an indication of a rotation of a nut 892 is configured to appear upon actuation of switch 896. It is further contemplated that a screen could be coupled to three or more switches or actuators and configured to display three or more pieces of information (e.g. a digital nut data 890, a rotation of a nut 892, an aggregate data of two of the nuts (not shown), and an aggregate data of all of the nuts (not shown)).

Figure 9:
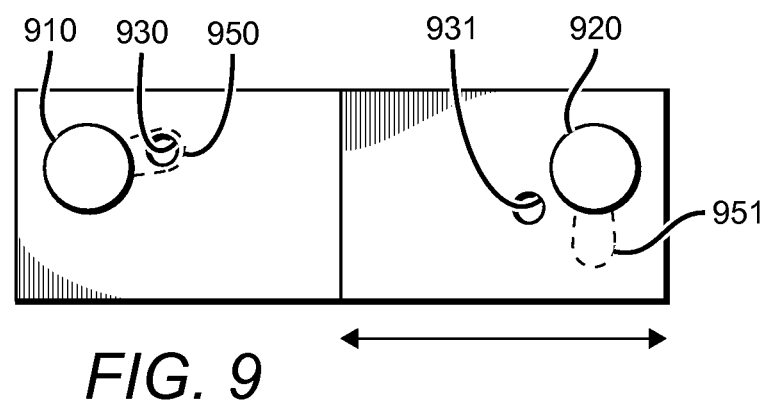
FIG. 9 is an illustration of two slidably attached bases.

FIG. 9 illustrates a device comprising two base portions slideably attached to one another. Each base comprises an alert hole 930 or 931, and is coupled to a nut cap (910 or 920) and nut rotation indicator 950 or 951. Such a configuration could allow a user to use a single device on multiple objects where the individual nuts of a device are positioned at different distances relative to one another.

Figure 10:
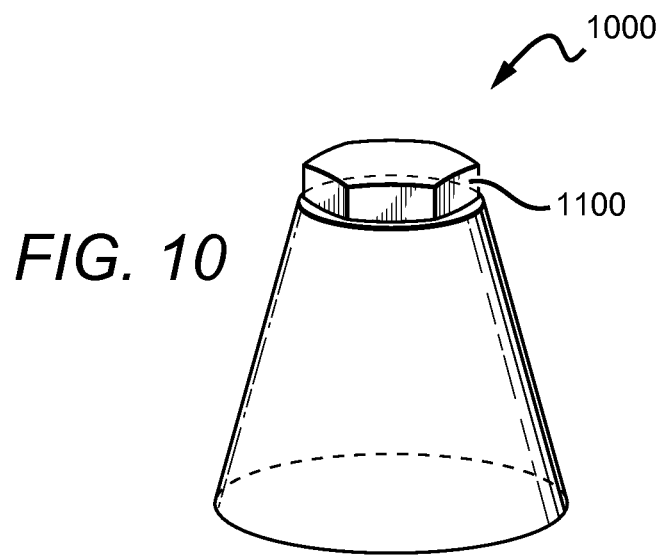
FIG. 10 is an illustration of a nut cap comprising a wrench acceptor.

It is contemplated that nut caps could comprise any suitable shape, including a cone, a cup, a cube, or a cylinder. The outside lining of the nut caps could be sized and configured to accept a wrench or other tool, such as a monkey wrench, open end wrench, box-end wrench, ratcheting box wrench, combination wrench, adjustable wrench, socket wrench, an Allen wrench, a Bristol wrench, an alligator wrench, a lug wrench, or a flare-nut wrench. An example of a nut cap sized and configured to accept a wrench is shown in FIG. 10. It is contemplated that the wrench accepting portion 1100 could be located at any portion along the outer lining of the nut cap 1000. Such portion can allow a user to readily tighten a corresponding nut (e.g. covered by nut cap 1000) without removing the safety device from the object to which it is coupled. It is further contemplated that a single nut cap 1000 could comprise two or more wrench accepting portions, each configured to accept a different wrench.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A safety device comprising:
   a base portion;
   a first nut cap;
   wherein the first nut cap is rotationally coupled to a first portion of the base, wherein the first nut cap comprises an electronic nut sensor and a nut rotation indicator; and
   wherein the electronic nut sensor is configured to acquire and store digital nut data representing an environmental state of at least one nut corresponding to the associated nut cap, and wherein the nut rotation indicator is configured to provide an indication of a rotation of the at least one nut.

2. The safety device of claim 1, wherein the electronic nut sensor comprises an active sensor.

3. The safety device of claim 2, further comprising a power source coupled with the active sensor.

4. The safety device of claim 3, wherein the power source comprises a solar cell.

5. The safety device of claim 3, wherein the power source comprises a thermocouple.

6. The safety device of claim 1, wherein the electronic nut sensor comprises a passive sensor.

7. The safety device of claim 6, wherein the passive sensor comprises a radio frequency tag.

8. The safety device of claim 1, wherein the electronic nut sensor comprises a wireless interface.

9. The safety device of claim 1, wherein the nut rotation indicator is the electronic nut sensor.

10. The safety device of claim 1, wherein the nut rotation indicator comprises a visual indicator.

11. The safety device of claim 1, wherein the first nut cap substantially covers the corresponding at least one nut.

12. The device of claim 1, wherein the environmental state comprises a non-rotational state.

13. The device of claim 1, wherein the digital nut data comprises at least one of a temperature, a force, a sheer, a stress, a strain, a tightness, and a log of data.

14. The device of claim 1, wherein the nut rotation indicator provides digital rotation data of the nut.

15. The device of claim 14, wherein the digital rotation data comprises at least one of an angle of rotation, a torque, a rate of rotation, a trend of rotation, and historical rotation data.

16. The device of claim 1, wherein the digital nut data comprises real-time data.

17. The device of claim 1, wherein the digital nut data comprises visual data.

18. The device of claim 1, wherein the device comprises a Nylon-based material.

19. The device of claim 1, further comprising a second nut cap rotationally coupled to a second portion of the base, wherein the second nut cap comprises an electronic nut sensor.

20. The device of claim 19, wherein the base is a circular rim.

21. A safety device comprising:
a circular rim having a plurality of nut caps rotationally attached to the rim, wherein at least one nut cap comprises an electronic nut sensor and a nut rotation indicator; and
wherein the electronic nut sensor is configured to acquire and store digital nut data representing an environmental state of at least one nut corresponding to the associated nut cap, and wherein the nut rotation indicator is configured to provide an indication of a rotation of the at least one nut.

22. An electronic nut cap comprising:
an electronic nut sensor and a nut rotation indicator;
wherein the electronic nut sensor is configured to acquire and store digital nut data representing an environmental state of at least one nut corresponding to the associated nut cap; and
wherein the nut rotation indicator is configured to provide an indication of a rotation of the at least one nut.

* * * * *